United States Patent [19]

Balhoff et al.

[11] Patent Number: 5,686,538

[45] Date of Patent: Nov. 11, 1997

[54] PROCESS FOR BROMINATING POLYSTYRENIC RESINS

[75] Inventors: Donald E. Balhoff; Billie B. Dadgar; Charles H. Kolich; Meng-Sheng Ao; Homer C. Lin, all of Baton Rouge, La.

[73] Assignee: Albemarle Corporation, Richmond, Va.

[21] Appl. No.: 721,398

[22] Filed: Sep. 26, 1996

[51] Int. Cl.$^6$ ............................................. C08F 8/22
[52] U.S. Cl. .................... 525/355; 525/333.4; 525/356
[58] Field of Search .................................. 525/355, 356

[56] References Cited

U.S. PATENT DOCUMENTS

| | | | |
|---|---|---|---|
| 1,890,772 | 12/1932 | Dykstra | 260/93.5 |
| 2,199,026 | 4/1940 | Levine et al. | 260/74 |
| 2,823,201 | 2/1958 | Wheaton | 260/93.5 |
| 3,009,906 | 11/1961 | Eichhorn et al. | 260/93.5 |
| 3,039,977 | 6/1962 | Ingram | 260/2.5 |
| 3,050,476 | 8/1962 | Tress et al. | 260/2.5 |
| 3,132,045 | 5/1964 | Hill | 117/138 |
| 3,474,067 | 10/1969 | Praetzel et al. | 260/41 |
| 3,506,741 | 4/1970 | Trepka et al. | 260/889 |
| 3,534,012 | 10/1970 | Dennis | 260/91.5 |
| 3,932,542 | 1/1976 | Gems | 260/650 R |
| 3,959,398 | 5/1976 | Jalics | 260/650 R |
| 3,975,354 | 8/1976 | Buxbaum et al. | 260/40 R |
| 4,028,486 | 6/1977 | Jalics | 526/293 |
| 4,074,032 | 2/1978 | Naarmann et al. | 526/44 |
| 4,137,212 | 1/1979 | Theysohn et al. | 260/37 N |
| 4,143,221 | 3/1979 | Naarmann et al. | 526/44 |
| 4,151,223 | 4/1979 | Neuberg et al. | 260/873 |
| 4,178,327 | 12/1979 | Hall et al. | 525/169 |
| 4,200,703 | 4/1980 | Diebel et al. | 525/357 |
| 4,352,909 | 10/1982 | Barda et al. | 525/157 |
| 4,360,455 | 11/1982 | Lindenschmidt et al. | 252/609 |
| 4,389,517 | 6/1983 | Priddy et al. | 526/64 |
| 4,501,859 | 2/1985 | Newman et al. | 525/356 |
| 4,513,116 | 4/1985 | Kowalski et al. | 525/53 |
| 4,548,995 | 10/1985 | Kowalski et al. | 525/354 |
| 4,554,326 | 11/1985 | Kowalski et al. | 525/354 |
| 4,636,554 | 1/1987 | Tada et al. | 525/359.3 |
| 4,650,832 | 3/1987 | Kowalski et al. | 525/354 |
| 4,832,873 | 5/1989 | Favstritsky et al. | 252/601 |
| 4,835,222 | 5/1989 | Sypniewski | 525/359.5 |
| 4,879,353 | 11/1989 | Sanders et al. | 525/357 |
| 4,975,496 | 12/1990 | Tigner et al. | 525/357 |
| 5,112,896 | 5/1992 | Dever et al. | 524/412 |
| 5,112,897 | 5/1992 | Dever et al. | 524/412 |
| 5,112,898 | 5/1992 | Dever et al. | 524/412 |
| 5,194,482 | 3/1993 | Chundury et al. | 524/412 |
| 5,235,000 | 8/1993 | McKinnie | 525/355 |
| 5,304,618 | 4/1994 | Atwell et al. | 526/293 |
| 5,326,837 | 7/1994 | Kissin | 526/150 |
| 5,532,322 | 7/1996 | Kadono et al. | 525/357 |
| B1 4,200,703 | 4/1980 | Diebel et al. | 525/340 |

FOREIGN PATENT DOCUMENTS

| | | |
|---|---|---|
| 0201411 | 12/1986 | European Pat. Off. . |
| 61-034723 | 8/1986 | Japan . |
| 2215807 | 8/1990 | Japan . |
| 1589700 | 5/1981 | United Kingdom . |
| WO9503341 | 2/1995 | WIPO . |

*Primary Examiner*—Bernard Lipman
*Attorney, Agent, or Firm*—Edgar E. Spielman, Jr.

[57] ABSTRACT

This invention features a process for brominating styrenic polymers which process comprises feeding a first stream comprising a brominating agent, a second stream comprising styrenic polymer and a third stream comprising bromination catalyst to a mixer to intimately mix such streams.

10 Claims, 1 Drawing Sheet

PROCESS FOR BROMINATING POLYSTYRENIC RESINS

BACKGROUND OF THE INVENTION

This invention relates to an economical and safe process for producing high quality brominated polystyrenic resins.

Brominated polystyrenic resins, i.e., polymers containing alkenyl aromatic repeating units, are useful flame retardants. Particularly useful are brominated polystyrenes, especially those containing at least about 60 wt % bromine. High value is placed on brominated polystyrene which has close to 70 wt % bromine and a near-white color. This highly valued product is not easily obtained as most processes are limited by the inverse correlation between high bromine content and good color. In addition to obtaining a high bromine content and good color, the brominated resin should have no or at least a very low degree of cross-linking present.

Most processes for brominating styrenic polymers feature contacting a brominating agent, e.g., bromine, BrCl, and the like, with a solution of the styrenic polymer in the presence of a Lewis acid catalyst, such as $AlCl_3$, $AlBr_3$, $FeCl_3$, and $FeBr_3$. Using this basic model, the art has, over the years, strived to divine the best possible process. Success has not been easy as the various proposed processes have not fully fulfilled their promise.

U.S. Pat. No. 4,975,496 describes an intriguing process for brominating styrenic polymers to obtain a high quality product in good yields. The process features contacting a solution of at least one styrenic polymer with a brominating agent in the presence of a Lewis acid catalyst, wherein both the styrenic polymer and the brominating agent are separately fed into contact with the Lewis acid catalyst. The '496 patent stresses the importance of the separated feeds. When the catalyst used is very active, say $AlCl_3$, it is also deemed critical to insure a thorough dispersion of some of the brominating agent in the catalyst before the styrenic polymer is fed. Thus, it is recommended that at least 5 mole percent of the total brominating agent be pre-added to the reactor.

The '496 process, while it may be an improvement over the prior art processes, is not a panacea. In a study of the bromination of polystyrene, it was concluded that processes which use separate brominating agent and polystyrene feeds, as is taught by the '496 patent, run the danger of experiencing vapor eruptions which can cause the reactor contents to be splashed to the top of the reactor and on into the reflux and feed trains. It is believed that the intensity of these eruptions will be highest where the more active catalysts are used and/or where the reaction conditions favor vigorous bromination. Also, it is predicted that the problem of vapor eruptions will be most serious in commercial-size reactors, say from about 500 to about 6,000 gal. reactors, since such reactors cannot be, from a practical viewpoint, as highly stirred as can be smaller reactors.

The vapor eruption is the result of poor heat and mass transfer. When the brominating agent feed is separate from the styrenic polymer feed and the reactor is large and not highly stirred, there are good opportunities for highly concentrated, large amounts of the two reactants to meet. The resulting exothermic reaction, without good heat transfer, can cause vaporization of some of the reaction solvent. Also, the bromination reaction produces HBr as a gaseous by-product which contributes to the total vapor volume. When the combined vapor volume is large and localized, there can be expected the above-mentioned eruption.

It is, therefore, an object of this invention to provide a process for brominating styrenic polymers, which process is safe from vapor eruptions and which produces a brominated styrenic polymer having excellent color, high bromine content and little cross-linking.

THE INVENTION

This invention features a process for brominating styrenic polymers, which process comprises feeding a first stream comprising a brominating agent, a second stream comprising styrenic polymer, and a third stream comprising bromination catalyst to a mixer to intimately mix such streams.

Since some styrenic polymers are either quite viscous or are solids at feed temperatures, it is preferred that the second stream additionally include a solvent capable of solubilizing the styrenic polymer. Also, for mass transfer reasons, it is preferred that the third stream include a liquid with which the catalyst can form a slurry, solution, suspension or dispersion. The intimate mix formed by the mixer can be fed to a reactor in which bromination and/or continued bromination of at least a portion of the styrenic polymer occurs.

By practicing the process of this invention in the above-described manner, several benefits are realized. First, by intimately mixing the three streams in a mixer, the formation of large volumes of vapor and the eruption of same are obviated. Second, it has been demonstrated that by using a feed mixture formed from a brominating agent and a styrenic polymer, the most active bromination catalyst can be used without having to practice prior art techniques to hopefully protect against cross-linking of the styrenic polymer. For example, so as to guard against cross-linking when $AlCl_3$ is the catalyst, there is no need to pre-add bromine to the reactor as is taught in U.S. Pat. No. 4,975,496. Nor is there a need to add a Lewis base, e.g., water, to the reaction vessel to control cross-linking as is taught in U.S. Pat. No. 4,200,703. Nor is there a need to use a less active catalyst in an anhydrous system to tame cross-linking as is taught in U.S. Pat. No. 4,352,909. Third, by forming a mixture from the brominating agent and styrenic polymer reactants, especially a homogenous mix, there is avoided concentration anomalies which can give rise to the production of undesirable by-products. In prior art processes where bromine is added to a reaction mass of styrenic polymer and catalyst, there is an anomalous zone, in the area of the bromine addition, in which the polymer sees an overabundance of bromine. In the case of adding separate bromine and styrenic polymer streams to a reactor containing a bromination catalyst, there will be two anomalous zones, one rich in bromine and the other rich in polymer. By not having the correct stoichiometry in these zones, there are introduced opportunities for the formation of undesirable by-products.

DESCRIPTION OF THE INVENTION

Figure 1:
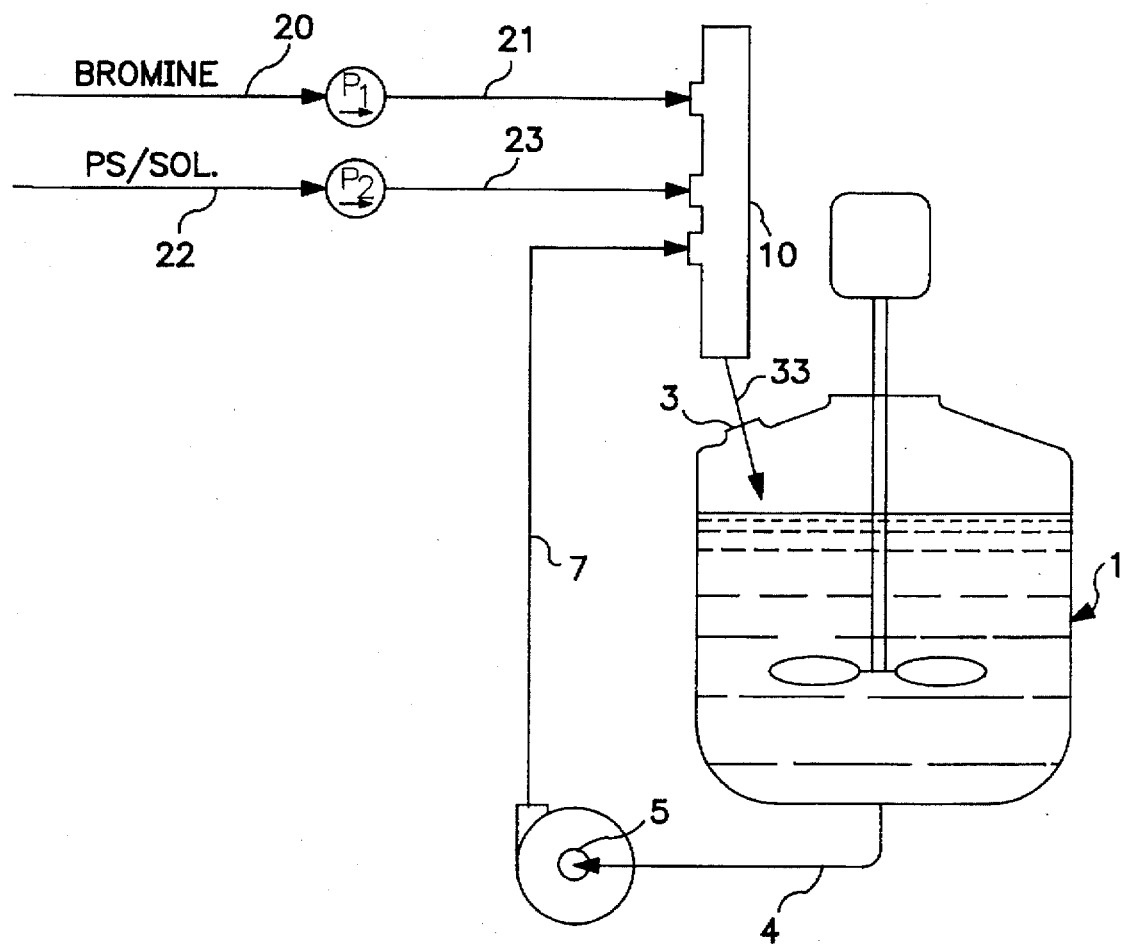
FIG. 1 is a schematic diagram depicting a process of this invention.

Styrenic polymers which are brominated in accordance with the present invention are homopolymers and copolymers of vinyl aromatic monomers, that is, monomers having an unsaturated moiety and an aromatic moiety. The preferred vinyl aromatic monomers have the formula:

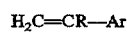

wherein R is hydrogen or an alkyl group having from 1 to 4 carbon atoms and Ar is an aromatic radical (including various alkyl and halo-ring-substituted aromatic units) of from 6 to 10 carbon atoms. Examples of such vinyl aromatic monomers are styrene, alpha-methylstyrene, ortho-methylstyrene, meta-methylstyrene, para-methylstyrene, para-ethylstyrene, isopropenyltoluene, isopropenylnaphthalene, vinyl toluene, vinyl naphthalene, vinyl biphenyl, vinyl anthracene, the dimethylstyrenes, t-butylstyrene, the several chlorostyrenes (such as the mono- and dichloro- variants), the several bromostyrenes (such as the mono-, dibromo- and tribromo- variants). Polystyrene is the currently preferred styrenic polymer and, when the styrenic polymer being brominated is a copolymer of two or more vinyl aromatic monomers, it is preferred that styrene be one of the monomers and that the styrene comprise at least 50 weight percent of the copolymerizable vinyl aromatic monomers.

The styrenic polymers, which are brominated in accordance with the present invention, are readily prepared by bulk or mass, solution, suspension or emulsion polymerization techniques comparable to those employed in the polymerization of styrene. Polymerization can be effected in the presence of free radical, cationic or anionic initiators, such as di-t-butyl peroxide, azo-bis(isobutyronitrile), di-benzoyl peroxide, t-butyl perbenzoate, dicumyl peroxide, potassium persulfate, aluminum trichloride, boron trifluoride, etherate complexes, titanium tetrachloride, n-butyllithium, t-butyllithium, cumylpotassium, 1,3-trilithiocyclohexane, and the like. The polymerization of styrene, alone or in the presence of one or more monomers copolymerizable with styrene, is well known and it is considered unnecessary to further discuss the polymerization process. The styrenic polymers having a molecular weight of at least 1,000, preferably at least 50,000 and most preferably 150,000 to 500,000, are brominated in accordance with the present invention. Although styrenic polymers outside these molecular weight ranges can be brominated in accordance with the present invention, there is typically no economic advantage in so doing.

The catalyst used in the processes of this invention can be any bromination catalyst, provided that the catalyst does not act to frustrate the efficient and safe production of a high quality brominated polystyrenic product. The favored catalysts are the Lewis acid catalysts which are typified by $AlCl_3$, $FeCl_3$, $AlBr_3$, $FeBr_3$, $SbCl_5$, $ZrCl_4$, and the like. Fe, Al and $Sb_2O_3$ may be used to form Lewis acid catalysts by simply adding them to the reaction system. Mixtures of catalyst can also be used. Once the catalyst has been added to the reaction system, it may undergo some reaction without significant loss of catalytic activity, e.g., $AlCl_3$ may convert to some extent to $AlBr_3$. The more preferred catalysts are the aluminum and iron-based catalysts. Of these, the most preferred are the aluminum and iron halides, especially the bromides and chlorides. $AlCl_3$ and $FeCl_3$ are most highly preferred, with $AlCl_3$ being the catalyst of choice.

The catalyst is used in an amount which is sufficient to obtain the catalytic effect sought. These catalytic amounts will depend on the activity of the catalyst, but will generally fall within the range of from about 0.2 to about 20 weight percent and preferably within the range of from about 0.5 to about 15 weight percent, based on the weight of the styrenic polymer being brominated. The most active catalysts will be used in the lower amounts while the less active catalysts will be used in the higher amounts. For the preferred aluminum and iron-based catalysts, it is preferred that they be used in amounts within the range of from about 0.5 to about 5 weight percent. $AlCl_3$ and $FeCl_3$ are useful in amounts within the range of from about 0.2 to about 10 weight percent. When $AlCl_3$ is the catalyst, amounts within the range of from about 0.5 to about 3 weight percent are preferred.

The brominating agents useful in the process of this invention can be any of those which can brominate aromatic carbons in the polymer's vinyl aromatic units (hereinafter also referred to as styrenic monomer units). The art recognizes $Br_2$ and BrCl as good brominating agents, with the former being most preferred. Bromine can be obtained commercially in the diatomic form or can be generated by the oxidation of HBr. $Br_2$ can be supplied either as a liquid or a gas. The amount of brominating agent used in the process should provide an overall mole ratio of total brominating agent to total styrenic polymer fed, which will provide from 1 to 3 bromine substitutions per styrenic monomer unit in the polymer. Generally, it is desired that the brominated styrenic polymer products of this invention contain at least 30 wt % bromine, based upon the total weight of the brominated polymer. It is preferred that the brominated polymer contain above about 50 wt % bromine and most preferably above about 60 wt % bromine. For any particular styrenic polymer, the amount of brominating agent used in the process will be determined by the bromine content desired, considering the highest bromine content which is obtainable with the process parameters chosen. The higher bromine contents will require the most brominating agent. It is pointed out that as perbromination is approached, it becomes more difficult to substitute the last bromines. Adding ever larger amounts of brominating agent does not always attenuate this difficulty. However, it is helpful, in attempting to maximize the bromine content, to provide a small stoichiometric excess of brominating agent. Stoichiometric excesses up to about 10% are preferred. The stoichiometry is easily determined as it requires one mole of $Br_2$ or BrCl per substitution sought. In practice, the practitioner will determine the bromine content sought on a weight basis and then will calculate, on an idealized basis, the number of moles of brominating agent needed to obtain the same. For example, if the styrenic polymer is polystyrene and the bromine content sought is 68 wt %, at least 2.7 moles of bromine or BrCl per styrene monomer unit will be required, not including any desired stoichiometric excess. For brominated polystyrene, a bromine content of from about 40 to about 70+wt % bromine is desirable. This range can be theoretically obtained with a mole ratio of bromine to styrene monomer of from about 0.9:1 to about 3.0:1 Preferred for brominated polystyrene is a bromine content of from about 60 to about 70+wt %, which can be obtained with a theoretical mole ratio of from about 1.9:1 to about 3.0:1 for bromine or BrCl. The processes of this invention can, with facility, provide up to 70 wt %, say 67–68 wt %, bromine. In determining the amount of brominating agent in the process, the brominating agent in the feed mixture and any brominating agent pre-added prior to the feed of the mixture are both counted. As pointed out herein, it is not necessary to pre-add a brominating agent to the catalyst and, thus, all of the process brominating agent requirements can be supplied via the feed of the mixture. If, however, the practitioner chooses to pre-add a brominating agent to the reactor, it can be done.

While the foregoing describes the overall quantitative relationship between the brominating agent and styrenic polymer, the quantitative relationship between these two reactants in the feed mixture has not been fully discussed. Generally, the mixture which is to be fed will contain from about 1 to about 8 moles of brominating agent per mole of styrenic monomer units and from about 0.5 to about 20 wt % of bromination catalyst per weight of styrenic polymer during the feed period. During the feed, the quantitative relationship can be constant or can vary within the above-mentioned range. (It is within the scope of this invention to allow for some excursions outside of the range so long as such does not do significant harm to the process efficiency or to product quality.) A preferred range is from about 2.5 to about 5 moles of brominating agent per mole of styrenic monomer units and from about 0.5 to about 5 wt % bromination catalyst per weight of styrenic polymer in the feed mixture. As can be appreciated, the use of an amount of brominating agent in the feed mixture which gives a mole ratio of brominating agent to styrenic monomer units which is less than or greater than the selected overall mole ratio of brominating agent to styrenic monomer units, will result in exhaustion of either the brominating agent or the styrenic polymer in forming the intimate mixture before exhaustion of the other constituent. For example, if the practitioner chooses to produce brominated polystyrene with a 70 wt % bromine content, an overall molar ratio of bromine to styrenic monomer units of 3.0:1, and any excess if desired, would be suitable. If the practitioner chooses to form a feed mixture in which the molar ratio of bromine to styrenic monomer units is 1:1, it can be seen that the amount of polystyrene to be fed will be completed before obtaining the needed overall amount of bromine. In this case, the practitioner first uses the 1:1 mixture and then continues on with just a bromine feed after the polystyrene feed has been exhausted. If, on the other hand, the molar ratio in the feed mixture is chosen to be 5:1, then the bromine will first become exhausted and the formation of the intimate mixture will have to be finished with the polystyrene and bromination catalyst alone. Generally, it is preferred to have the overall molar ratio and the feed mixture ratio at least somewhat similar. In all cases though, the initial feed should preferably contain at least a molar ratio of bromine to styrenic monomer units of 1:1.

It is preferred that the bromine used in the process of this invention be essentially anhydrous, i.e., contain less than 100 ppm (weight basis) water and contain no more than 10 ppm organic impurities, e.g., oil, grease, carbonyl containing hydrocarbons, iron, and the like. Available, commercial grade bromine may have such purity. If, however, such is not available, the organic impurities and water content of the bromine can be conveniently reduced by mixing together a 3 to 1 volume ratio of bromine and concentrated (94–98 percent) sulfuric acid. A two-phase mix is formed which is stirred for 10–16 hours. After stirring and settling, the sulfuric acid phase, along with the impurities and water, is separated from the bromine phase. To further enhance the purity of the bromine, the recovered bromine phase can be subjected to distillation.

As before stated, it is preferred that the processes of this invention use a solvent. The solvent must be capable of solubilizing the styrenic polymer feed and be relatively inert to the process at reaction conditions. The solvent should also exhibit solubility of the underbrominated styrenic polymers and, in preferred cases, the final brominated product. Preferred solvents are those in which the bromination catalyst is also soluble, readily dispersed or readily suspended. Halogenated solvents are preferred and are exemplified by carbon tetrachloride, chloroform, tetrachloroethane, methylene chloride, dichloroethane, trichloroethylene, trichlorobenzene, methylene bromide, 1,2-dibromoethane, dichlorodifluoromethane, bromochloromethane, and mixtures thereof Especially preferred are bromochloromethane, 1,2-dichloroethane, and methylene chloride.

By forming a solution of solvent and styrenic polymer, the polymer becomes easy to handle and facile in forming the intimate mix. The solutions of this invention preferably contain from about 5 to about 50 wt % polymer. More highly preferred are those which contain from about 5 to about 30 wt % polymer.

It is preferred to have the bromination catalyst to be in association with a liquid so that the catalyst can be in a slurry, solution, dispersion or suspension. Such will enhance reaction mass mixing and mass transfer qualities. It is expedient, but not necessary, to use the same liquid, i.e., solvent, that is used to form the styrenic polymer solution. Thus, in a preferred mode, processes of this invention will provide a mixture of halogenated solvent and catalyst which can be easily pumped to the mixer. The mixture of liquid and catalyst is best described as a suspension. Generally, the suspension will be from about 95 to about 99.8 wt % liquid and preferably from about 99 to about 99.8 wt %, based on the total weight of liquid and catalyst.

The solvent used to dissolve the styrenic polymer and the liquid used in association with the catalyst are preferably dry, that is, they contain less than about 200 ppm (weight basis) water between them and preferably less than about 150 or 100 ppm water. The presence of water is not desired as, in significant quantities, it can deactivate the catalyst to an undesirable extent. If, for some reason, the practitioner has large amounts of water in the process and dewatering is not practical, then it may be possible to overcome the situation by simply increasing the amount of the catalyst used. For the process of this invention, it is not a feature to solely use water to avoid cross-linking as is taught in U.S. Pat. No. 4,200,703—but rather, this invention attenuates cross-linking by means which include its novel feeding technique.

The feed of the three streams should occur expeditiously, with consideration being give to the ability of the process equipment to handle the heat load from the exothermic bromination process, the evolving HBr, and other process concerns. In short, the feed can occur over the shortest time period that will be allowed by the equipment without excursion outside of the critical process parameters. Generally, it is anticipated that the feed period will be from 0.5 to 3 hours for a commercial-size plant. Shorter feed periods are expected for smaller scale processes.

The process of this invention occurs at a temperature within the range of from about −20 to about 60° C. and preferably within the range of from about 0 to about 10° C. The pressure can be atmospheric, subatmospheric or superatmospheric.

To carry out a process of this invention, a bromination catalyst, say $AlCl_3$, is suspended with essentially anhydrous bromochloromethane to give an easily stirrable suspension. This suspension is fed to a glass-lined, stirred reactor having an exterior loop and brought to a temperature within the range of from about −5 to about 10° C. The suspension is kept under an inert, dry atmosphere in the reactor. A solution of a styrenic polymer and solvent, e.g., bromochloromethane, is prepared. From the reactor is withdrawn a stream which is initially comprising the suspended catalyst. The suspended catalyst stream, a stream of the styrenic polymer solution and a stream of the bromination agent are fed to a mixer located in-line with the exterior loop. Within the mixer is formed an intimate mixture of the three streams. Some bromination may occur in the mixture as it is returned back to the reactor to form a part of the reactor contents. The process continues until all of the brominating agent and styrenic polymer have been fed. As the process continues, the degree of bromination of the polystyrene will increase.

Exemplifying the use of an exterior reactor loop, reference is made to FIG. 1 wherein there is shown a reactor generally designated by the numeral 1. Reactor 1 is a stirred reactor and initially contains a catalyst charge and a solvent, say any of the preferred halogenated hydrocarbon solvents. Reactor discharge conduit 4 provides a stream from reactor 1 which is fed to pump 5. Pump 5 pressurizes the stream so that it is fed with force via conduit 7 to impingement mixer 10. Bromine is fed via conduit 20 to pump $P_1$ and thence, via conduit 21 to impingement mixer 10. A solution of polystyrene and solvent (preferably the same solvent as that which is in reactor 1) is fed via conduit 22 to pump $P_2$ and then on to impingement mixer 10 via conduit 23. In mixer 10 the three streams are formed into an intimate mixture.

The discharge from impingement mixer 10 is fed via conduit 33 to reactor 1 through feed port 3. The removal of contents from reactor 1 and their feed to impingement mixer 10 continues to occur until at least substantially all of the bromine and polystyrene/solvent solution have been fed.

As can be appreciated, the contents of reactor 1 change in composition during the bromine and polystyrene/solvent solution feeds. Initially, the contents of reactor 1 comprise catalyst and solvent. As the process runs, the reactor contents comprise and begin to become more rich in brominated polystyrene, some of which is underbrominated and some of which is of the degree of bromination sought. During a cook period, the final bromination occurs. Continued routing of a reactor stream through the exterior loop can continue during the cook period to aid in mixing.

As pointed out earlier, the bromination of styrenic polymers is a substitution reaction. The main by-product from this reaction is HBr. The HBr formed in the process is usually found in the head space above the reactor contents. It is preferred that the HBr be removed and passed to a water scrubber or be stored as dry HBr. A dry, inert gas, say nitrogen, can be used as a pad over the reactor contents to minimize the presence of water therein.

The reactor is kept at a low temperature, e.g., from about 0 to about 10° C., during the feed of the styrenic polymer and/or brominating feed, as the case may be, and preferably from about 4 to about 8° C.

After the feed is accomplished, the reactor is maintained for a cook period of from about 0.5 to about 6 hours and preferably from about 1 to about 3 hours. The cook temperature is within the range of from about 0 to about 10° C. and preferably within the range of from about 2 to about 5° C. The cook period serves to continue the bromination until the sought degree of bromination is obtained. It may be for a long period if the reaction parameters provide for mild bromination conditions during the bromine and polystyrene feeds or it may be for a short period if the parameters chosen provide for more severe bromination conditions. The cook period generally occurs in the reactor.

After the cook period, the reaction mass can be treated with water, sodium sulfite, sodium gluconate, and sodium hydroxide to deactivate the catalyst, kill any remaining brominating agent, and to adjust the reaction mass pH. After these treatments, the reaction mass is settled to obtain a two-phase reaction mass containing an organic phase, which contains, as a solute, the brominated styrenic polymer product, and an aqueous phase. The aqueous phase is decanted and the remaining organic phase is stripped of its solvent component. It is most convenient to accomplish this strip by pouring the organic phase into boiling water. As the solvent is stripped, the brominated styrenic polymer product forms a precipitate. The precipitate can be recovered by any liquid-solid separation technique, e.g., filtration, centrifugation, etc. The recovered precipitate is then dried.

The brominated styrenic polymers of this invention are suitable for use as flame retardants in thermoplastics, especially engineering thermoplastics, e.g., polybutylene terephthalate, polyethylene terephthalate, nylon and the like. These brominated polymers are used in flame retarding quantities, say from about 5 to about 20 wt % brominated polymer per hundred weight of thermoplastic. Conventional blending techniques can be used as taught in the prior art. In addition, conventional additives, such as UV stabilizers, impact modifiers, flame retardant synergists, dyes, pigments, fillers, plasticizers, flow aids, antioxidants, free radical initiators, and the like may be used as the need requires.

What is claimed:

1. A process for brominating styrenic polymers, which process comprises feeding a first stream comprising brominating agent, a second stream comprising styrenic polymer and a third stream comprising bromination catalyst to a mixer to intimately mix such streams.

2. The process of claim 1 wherein the intimate mix is fed to a reaction vessel from which the third stream emanates.

3. The process of claim 1 wherein the second stream is additionally formed from a solvent which solubilizes the styrenic polymer.

4. The process of claim 1 wherein the bromination catalyst is present in a solution, slurry, dispersion or suspension.

5. The process of claim 2 wherein the second stream is additionally formed from a solvent which solubilizes the styrenic polymer and the bromination catalyst is present in a suspension formed at least from the bromination catalyst and a solvent of the type used solubilize the styrenic polymer.

6. The process of claim 1 wherein the bromination catalyst is a Lewis acid catalyst.

7. The process of claim 1 wherein the bromination catalyst is $AlCl_3$, $AlBr_3$, $FeCl_3$, $FeBr_3$ or a mixture of any two or more of the foregoing.

8. The process of claim 1 wherein the bromination catalyst is $AlCl_3$, $AlBr_3$ or a mixture thereof and there is no substantial pre-addition of brominating agent to the bromination catalyst prior to initial formation of the intimate mixture.

9. The process of claim 1 wherein the bromination catalyst is contained in a reactor and a stream from the reactor, comprising the bromination catalyst, is fed to a mixer exterior of the reactor and to which is also fed the brominating agent and the styrenic polymer to yield an intimate mixture of the three feeds, the mixture being fed back to the reactor.

10. The process of claim 9 wherein such feedings occur substantially continuously until most all of the brominating agent and styrenic polymer feeds have been completed.

* * * * *

UNITED STATES PATENT AND TRADEMARK OFFICE
CERTIFICATE OF CORRECTION

PATENT NO. : 5,686,538

DATED : Nov. 11, 1997

INVENTOR(S) : Donald E. Balhoff; Billie B. Dadgar; Charles H. Kolich; Meng-Sheng Ao; Homer C. Lin It is certified that error appears in the above-identified patent and that said Letters Patent is hereby corrected as shown below:

Column 8, Line 21, reads "... feeding a first stream ..." and should read -- ... feeding, essentially simultaneously, a first stream ... --.

Column 8, Line 24, reads "... streams." and should read -- ... streams prior to introduction to a reaction vessel. --.

Column 8, Line 26, reads "to a reaction ..." and should read -- to said reaction ... --.

Signed and Sealed this

Nineteenth Day of May, 1998

BRUCE LEHMAN

*Attest:*

*Attesting Officer*       *Commissioner of Patents and Trademarks*